United States Patent [19]
Karcher et al.

[11] 3,918,492
[45] Nov. 11, 1975

[54] MINIMUM SPILL QUICK DISCONNECT COUPLING

[75] Inventors: Thomas D. Karcher, Rocky River; Aly A. Kourah, Brook Park, both of Ohio

[73] Assignee: The Hansen Manufacturing Company, Cleveland, Ohio

[22] Filed: Feb. 7, 1974

[21] Appl. No.: 440,462

[52] U.S. Cl. ........................................... 137/614.04
[51] Int. Cl.² ..................... F16L 29/00; F16L 37/28
[58] Field of Search..... 137/614.03, 614.04, 614.06, 137/614.18; 251/149.6, 149.7

[56] References Cited
UNITED STATES PATENTS

| | | | |
|---|---|---|---|
| 2,451,218 | 10/1948 | Hengst | 137/614.03 X |
| 2,545,796 | 3/1951 | Scheiwer | 137/614.03 X |
| 2,753,195 | 7/1956 | Palmer | 137/614.03 |
| 3,123,099 | 3/1964 | Breuning et al. | 285/277 X |
| 3,285,283 | 11/1966 | Calvin | 137/614.03 |
| 3,613,726 | 10/1971 | Torres | 137/614.03 |
| 3,706,318 | 12/1972 | Baniadam et al. | 137/614.03 |
| 3,731,705 | 5/1973 | Butler | 137/614.06 |
| 3,777,771 | 12/1973 | Visscher | 137/614.04 X |

*Primary Examiner*—William R. Cline

[57] ABSTRACT

An improved coupling includes a socket assembly having a centrally disposed main valve, a valve stem, and a head end seal on the valve stem. When the coupling is to be connected, a plug assembly is inserted into the socket assembly and the main valve is opened by engagement of the socket valve stem with a plug valve. Continued inward movement of the plug assembly moves a slide valve away from the head end seal against the influence of a biasing spring. As this is occurring, the plug valve is opened and the head end of the socket valve moves into a plug valve chamber so that fluid can flow freely from the socket assembly through the plug assembly. When the coupling is to be disconnected, the plug assembly is withdrawn from the socket assembly. As this occurs, the plug valve is closed and the slide valve moves into sealing engagement with a socket body seal and with the head end seal on the socket valve stem. Continued withdrawal of the plug assembly enables the slide valve biasing spring to press the slide valve against the head end of the socket valve stem to move the socket valve stem outwardly and close the main valve. As the coupling is disconnected, the amount of fluid not sealingly retained in the socket and plug is only enough to wet the engaging surfaces.

7 Claims, 7 Drawing Figures

MINIMUM SPILL QUICK DISCONNECT COUPLING

BACKGROUND OF THE INVENTION

The present invention relates generally to an improved coupling assembly and more particularly to a coupling which minimizes fluid spillage as it is disconnected.

When a coupling is disconnected, it is frequently desirable to minimize the amount of fluid which is spilled or allowed to escape from the coupling. There are many known types of couplings which have been designed to tend to minimize spill. Some of these known couplings are disclosed in U.S. Pat. Nos. 2,451,218; 2,753,195; 3,123,099; 3,613,726; and 3,731,705. These known couplings have been more or less successful in limiting spillage. However, it is believed that they do not represent optimum combination of low cost construction and desirable operating characteristics.

SUMMARY OF THE PRESENT INVENTION

The present invention provides a new and improved minimum spillage coupling which is relatively easy to assemble and inexpensive to fabricate. The improved minimum spillage coupling includes a socket assembly having a socket valve stem with a head end seal which is sealingly engaged by a slide valve as the plug assembly is disconnected from the socket assembly. A slide valve biasing spring then presses the slide valve against the valve stem to pull a main valve to a closed condition. The slide valve also moves into sealing engagement with a socket body seal as the plug assembly is withdrawn. The cooperation between the slide valve and the head end seal on the valve stem is such as to minimize spillage as the coupling is disconnected.

Accordingly, it is an object of this invention to provide a new and improved coupling which tends to minimize spillage when it is disconnected and which is relatively easy to assemble and inexpensive to fabricate.

Another object of this invention is to provide a new and improved coupling having a socket assembly with an internal slide valve which engages a head end seal on a socket valve and is effective to operate a main valve to a closed condition as the coupling is disconnected.

Another object of this invention is to provide a new and improved coupling which tends to minimize spillage when it is disconnected by moving a plug assembly out of a socket assembly in such a manner that a slide valve moves into engagement with a socket body seal and with a head end seal on a socket valve stem as a plug valve is closed.

Another object of the invention is to provide a coupling that can be connected with relatively high pressure in the conduit connected to the socket.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
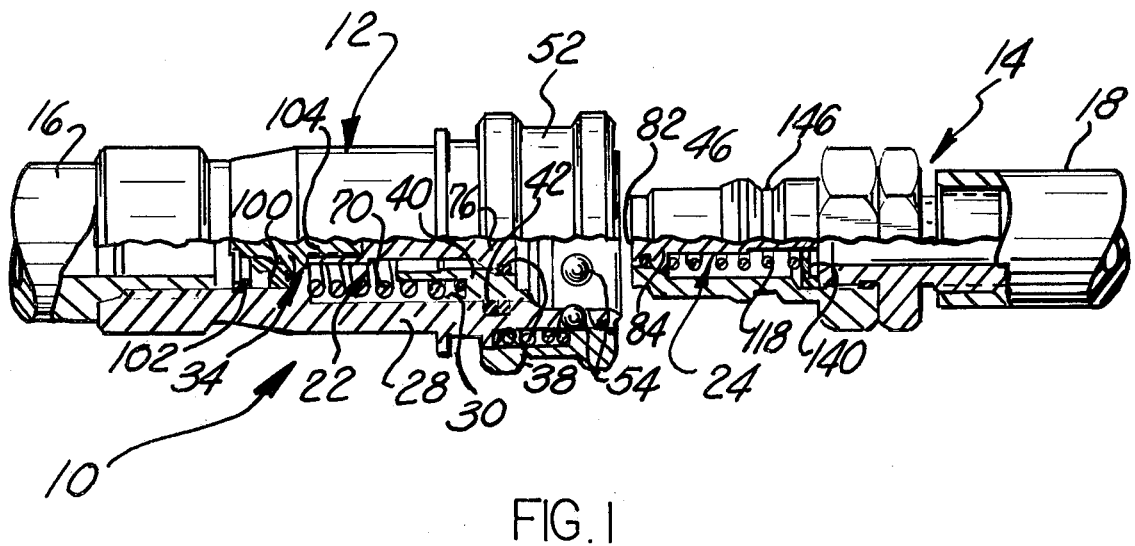
FIG. 1 is a partially broken away illustration of a coupling constructed in accordance with the present invention, the coupling being shown in a disconnected condition.

An improved coupling 10 constructed in accordance with the present invention is illustrated in FIG. 1 in a disconnected condition in which a socket assembly 12 is spaced apart from a plug assembly 14. To connect a pair of conduits 16 and 18 in fluid communication, the plug assembly 14 is telescopically received in the socket assembly 12. The socket assembly 12 has a socket valve arrangement 22 which cooperates with a plug valve 24 in such a manner as to tend to minimize spillage upon disconnection of the coupling 10.

Figure 2:
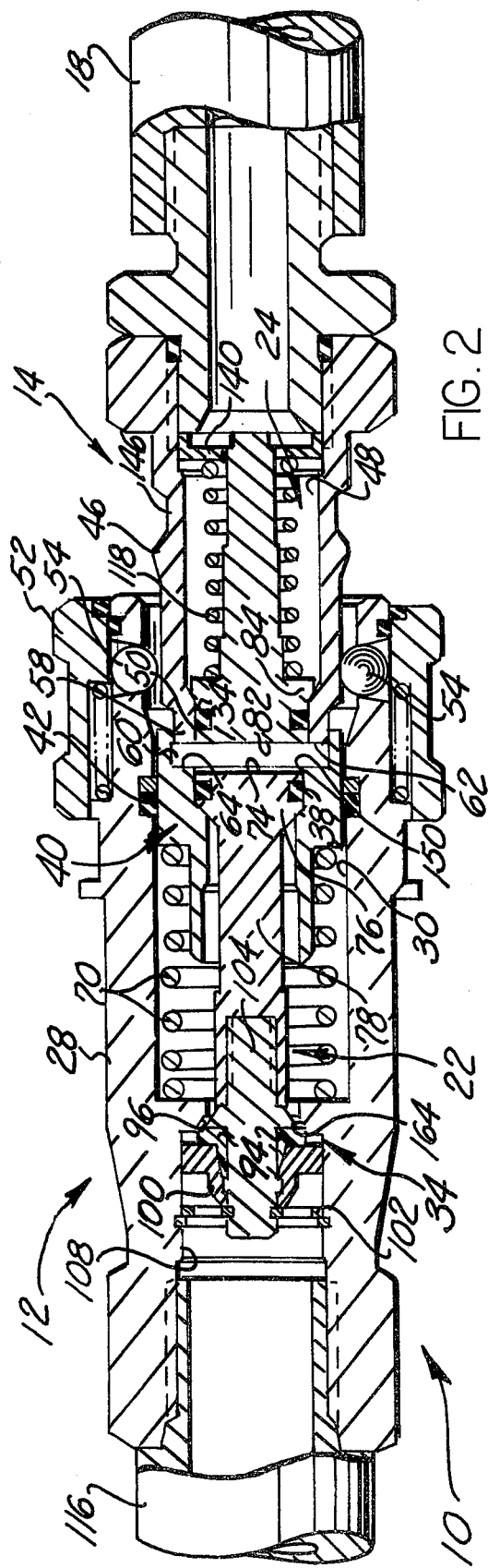
FIG. 2 is an enlarged sectional view of the coupling of FIG. 1, illustrating the relationship between plug and socket assemblies as the plug assembly enters the socket assembly.

The socket assembly 12 includes a generally cylindrical socket body 28 which defines an axially extending socket valve chamber 30 (see FIG. 2). The socket valve arrangement 22 is disposed in the valve chamber 30 in a coaxial relationship with the socket body 28 and includes a main valve 34 and a head end valve seal 38 which is coaxial with and disposed axially outwardly of the main valve 34. A generally cylindrical sleeve or slide valve 40 engages the head end seal 38 and an annular socket body seal 42 when the coupling is in the disconnected condition of FIG. 2. Thus, both the main valve 34 and the slide valve sleeve 40 prevent the leakage of fluid from the socket assembly 12 when the coupling is disconnected.

The plug assembly 14 includes a generally cylindrical plug body 46 which defines a valve chamber 48. The plug valve 24 is disposed within the valve chamber 48 and includes an annular seal 50. The seal 50 cooperates with the plug body 46 to block fluid flow through the plug assembly 14 when the coupling 10 is disconnected.

Figure 6:
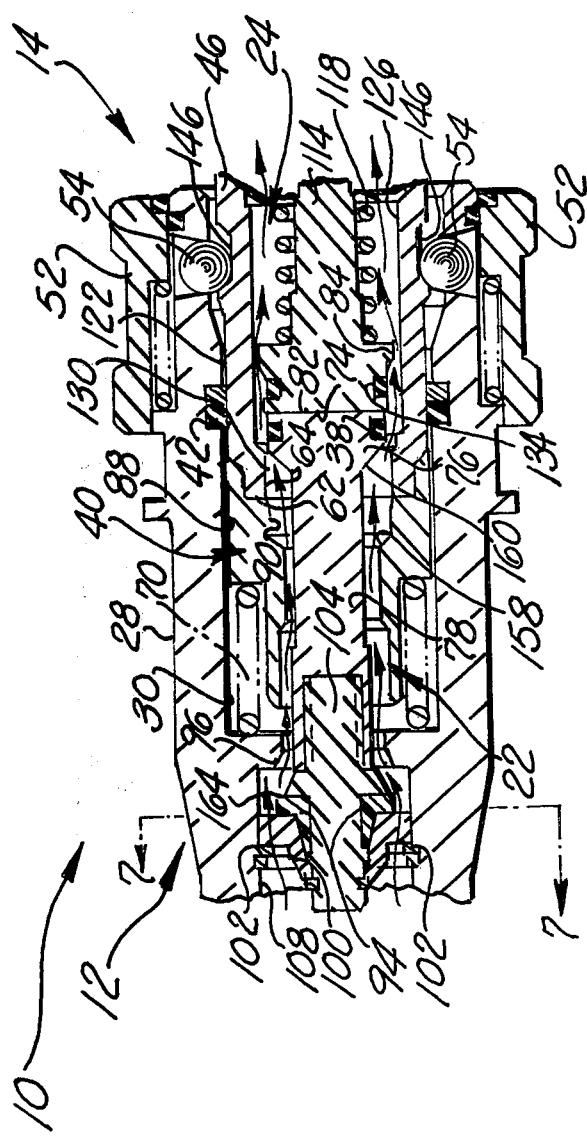
FIG. 6 is a half-sectional view illustrating the coupling in a fully connected condition.

The coupling 10 is operated from the disconnected condition of FIG. 1 to the connected condition of FIG. 6 by inserting the plug assembly 14 into the socket assembly 12. As the plug assembly 14 is inserted into the socket assembly 12, a cylindrical locking or latching sleeve 52 (see FIG. 1) is pulled axially inwardly or back to release a plurality of spherical locking balls 54 (see FIG. 3) in a known manner. As the plug body 46 moves further into the socket body 28, a generally cylindrical nose end portion 58 of the plug body 46 is received within a circular recess 60 formed by the slide valve 40 (see FIG. 2). Further inward movement of the plug assembly 14 brings an annular end face 62 of the plug body 46 into abutting engagement with an annular surface 64 formed on the slide valve 40 (see FIG. 3).

Continued inward movement of the plug assembly 14 presses the slide valve 40 inwardly against the influence of a biasing spring 70. After the slide valve 40 has moved inwardly through a relatively small distance from the position shown in FIG. 2, a circular head end surface 74 on a head portion 76 of a socket valve stem 78 is engaged by a circular end surface 82 on a head portion 84 of the plug valve 24. The socket body 28, slide valve 40, and valve stem 78 are all disposed in a coaxial relationship.

Figure 3:
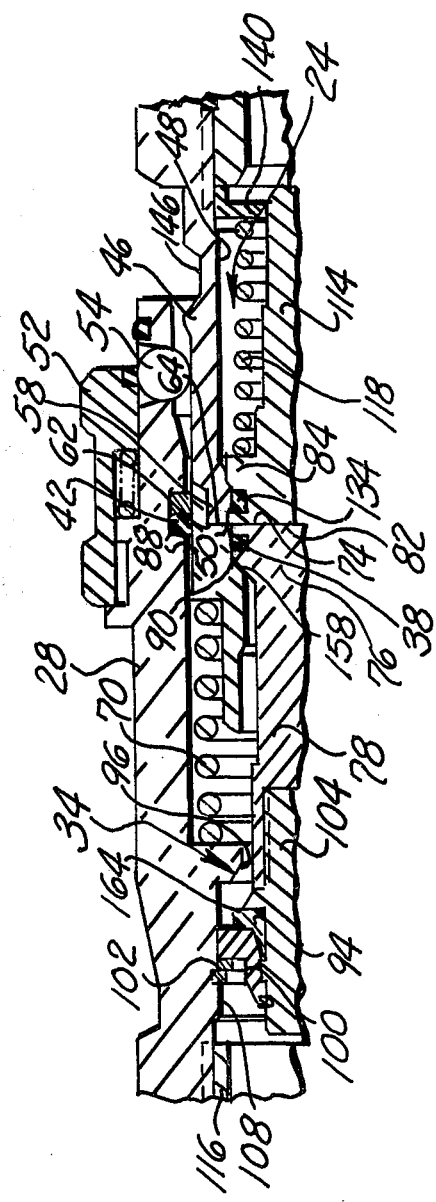
FIG. 3 is a fragmentary half-sectional view of the coupling assembly of FIG. 2 with the plug assembly inserted further into the socket assembly and a main socket valve in an open condition.

Further inward movement of the plug assembly 14 causes the socket valve stem 78 to be moved inwardly to operate the main valve 34 from the closed condition of FIG. 2 to the opened condition of FIG. 3. It should be noted that even though the main valve 34 is open, fluid flow from the socket assembly 12 to the plug assembly 14 is blocked by sealing engagement of a cylindrical outer surface 88 on the slide valve 40 with the annular socket body seal ring 42 and by engagement of a cylindrical inner surface 90 on the slide valve with the annular head end seal ring 38. However, an annular main seal washer 94 is disposed axially inwardly of a frustroconical main valve seat 96 so that fluid can flow through the open main valve 34.

Figure 7:
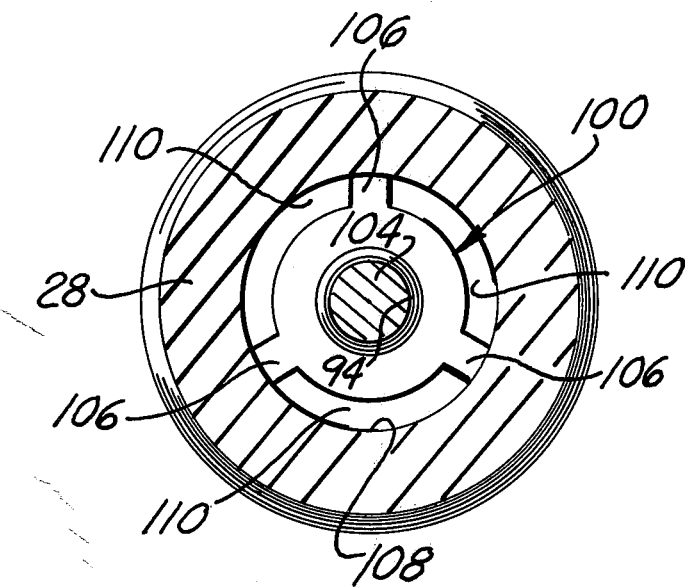
FIG. 7 is a sectional view taken generally along the line 7—7 of FIG. 6, illustrating the configuration of openings through which fluid flows when the coupling is connected.

As the main valve 34 is operated from the closed condition of FIG. 2 to the open condition of FIG. 3, a combination guide and stop element 100 is moved axially inwardly into abutting engagement with an annular stop ring 102. The combination guide and stop element 100 is fixedly connected with a main valve base 104 and is provided with a plurality of radially outwardly projecting guide arms 106 (see FIG. 7) which engage a cylindrical inner wall 108 of the socket body 28. The guide elements 106 cooperate with the socket wall 108 to define a plurality of arcuate passages 110 (FIG. 7) through which fluid can flow when the main valve 34 is in the opened condition of FIG. 3.

Once the main valve 34 has been operated to the open condition of FIG. 3, the stop ring 102 prevents further axially inward movement of the valve stem 84. Therefore, upon continued inward movement of the plug assembly 14, the slide valve 40 is moved axially inwardly relative to the socket stem 78 by the plug body 46. During initial movement of the slide valve 40 relative to the socket valve stem 78, the cylindrical inner surface 90 in the slide valve moves out of sealing engagement with the annular head end seal 38 (see FIG. 4). As this is occurring, the head end 84 and stem 114 of the plug valve 24 are pressed inwardly against the influence of a biasing spring 118 by abutting engagement between the circular end surfaces 74 and 82 of the socket and plug valve stem heads 76 and 84.

As the plug assembly 14 continues to be inserted into the socket assembly 12, the cylindrical outer surface 88 of the slide valve 40 moves out of sealing engagement with the annular socket body seal 42. As this occurs, a cylindrical outer surface 122 of the plug body 46 moves into sealing engagement with the socket body seal 42. Contemporaneously therewith, the head end 76 of the socket valve stem 78 moves into a generally cylindrical valve chamber 126 formed by the plug body 46.

Figure 5:
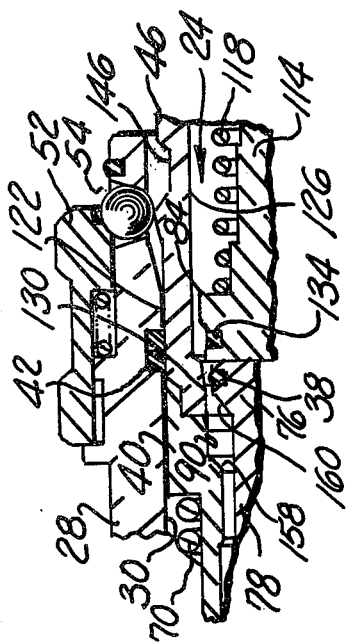
FIG. 5 is a fragmentary half sectional view, generally similar to FIG. 4, illustrating the plug body in sealing engagement with the socket body seal.

As the head end 76 of the socket valve stem 78 moves into the plug valve chamber 126, the annular head end seal 38 moves through a circular opening defined by a cylindrical inner surface 130 of the plug body 46 (FIG. 5). The cylindrical surface 130 has a diameter which is greater than the outside diameter of the annular head end seal 38. Therefore, as soon as an annular plug seal 134 moves out of sealing engagement with the annular surface 130, a restricted flow of fluid is established from the socket assembly 12 to the plug assembly 14.

Continued insertion of the plug assembly 14 into the socket 12 operates the plug valve 24 to the fully open condition of FIG. 6 to provide for a free flow of fluid through the now open main valve 34, around the head end seal 38 on the socket valve head 76 and the seal 134 on the plug valve head 84. A plug valve support and guide spider 140 (FIGS. 2 and 3) is constructed in the manner disclosed in U.S. Pat. No. 2,823,048 and has leg portions which enable fluid to flow from the plug valve chamber 126 to the conduit 18 connected with the plug assembly 14 when the coupling is in the engaged condition of FIG. 6. It should be noted that when the coupling 10 is in the engaged condition of FIG. 6, the latch sleeve 52 is released to hold the locking balls 54 in engagement with an annular retaining groove 146 formed in the plug body 46.

When the coupling 10 is operated from the connected condition of FIG. 6 to the disconnected condition of FIG. 1, the socket valve arrangement 22 cooperates with the plug assembly 14 in such a manner to minimize spillage or leakage of fluid. This is accomplished by moving the plug head end seal 134 into sealing engagement with the cylindrical surface 130 on the plug body 46 and by moving the slide valve 40 into sealing engagement with the socket body seal 42 and the head end seal 38 in the manner shown in FIG. 3 before breaking the fluid connection between the socket and plug assemblies 12 and 14. Therefore, the only fluid which is lost or spilled upon disconnection of the coupling assembly 10 is the relatively small volume of fluid trapped in the annular space 150 (see FIG. 3) between the two seals 38 and 134. Since the annular space 150 can hold a relatively small volume of fluid, the leakage or spillage of fluid upon disconnection of the coupling assembly 10 tends to be minimized.

When the coupling assembly 10 is to be operated from the connected condition of FIG. 6 to the disconnected condition of FIG. 1, the locking sleeve or slide 52 is moved axially inwardly to release the latch balls 54. The plug body 46 is then moved axially out of the socket valve chamber 30.

Upon initial outward movement of the plug body 46, the slide valve 40 is moved axially outwardly from the position shown in FIG. 6 to the position shown in FIG. 5 under the influence of the biasing spring 70. It should be noted that the socket head end seal 38 passes freely through the opening defined by the cylindrical inner surface 130 of the plug body 46. If the annular seal ring 38 was to sealingly engage the cylindrical surface 130 as the coupling was disconnected, a hydraulic lock condition would result. Such a hydraulic lock would prevent full sealing engagement of the socket head end seal 38 with the cylindrical inner surface 90 of the slide valve 40 with a resulting excessive leakage of fluid from the socket assembly.

Figure 4:
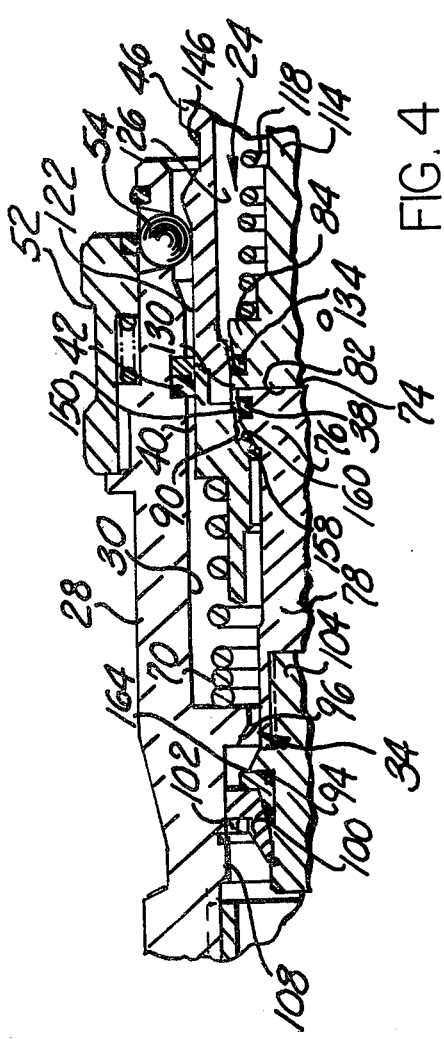
FIG. 4 is a fragmentary half-sectional view illustrating the relationship between a socket slide valve, a seal disposed on the socket body, and a head end seal on a socket valve stem as the plug assembly is inserted into the socket assembly.

As the plug body 46 continues to be withdrawn from the socket assembly 12, the biasing spring 70 moves the slide valve 40 outwardly into sealing engagement with the socket body seal 42 (see FIG. 4). At this time, the plug head end seal 134 has moved into sealing engagement with the cylindrical inner surface 130 of the plug body 46. It should be noted that the plug valve 24 seals the plug 14 prior to closing of the main valve 34 and movement of the slide valve 40 into sealing engagement with the socket head end seal 38.

Upon still outward movement of the slide valve 40, the cylindrical internal surface 90 of the slide valve 40 moves into sealing engagement with the head end seal 38 (FIG. 3). This traps a relatively small amount of fluid in the annular space 150 between the plug head end seal 134 and socket head end seal 38. This relatively small volume of fluid is all that is lost when the coupling assembly is disconnected. At this time the slide valve 40 will have moved back into sealing with the socket body seal 42.

Upon continued outward movement of the plug assembly 14, the slide valve 40 moves the head end 76 of the socket valve stem 78 axially outwardly to operate the main valve 34 from the open condition of FIG. 3 to the closed condition of FIG. 2. Thus, after the socket head seal 38 has been sealingly engaged by the slide valve 40, continued outward movement of the slide valve 40 under the influence of the spring 70 pulls the socket valve stem 78 outwardly. This outward movement of the socket valve stem 78 moves the annular main valve seal 94 into abutting engagement with the frustroconical main valve seat 96. Although frictional engagement of the head end seal 38 with the cylindrical surface 90 tends to pull the socket valve stem 78 outwardly, the slide 40 has a frustroconical inner surface 158 which moves into abutting engagement with a frustroconical surface 160 on the socket valve head end 76. Continued outward movement of the slide 40 causes the surface 158 to press against the surface 160 to positively pull the socket valve stem 78 outwardly.

As the socket valve stem 78 is moved outwardly by the slide valve 40, an annular corner portion 164 of the main washer 94 moves into abutting engagement with the frustroconical main valve seat 96 (see FIG. 2). This engagement between the main washer 90 and the main valve seat 96 closes the main valve 34 to block fluid flow through the socket assembly 12. Thus, when the main valve 34 is closed, fluid flow through the socket assembly is blocked by both the main valve and sealing engagement of the socket body seal 42 with the slide valve 94 and sealing engagement of the head end seal 38 with the inner surface of the slide valve. The spring 70 on the slide valve maintains the main valve 34 in the closed condition of FIG. 2 after the plug assembly 14 has been disconnected from the socket assembly 12.

If the coupling 10 is operated from the disconnected condition of FIG. 1 to the connected condition of FIG. 6 when there is a relatively high fluid pressure in the conduit 16, the main valve 34 is held closed by fluid pressure as the coupling is connected. After the coupling has been connected, the main valve is opened by pumping up the pressure in the conduit 18. Thus as the plug assembly 14 is inserted into the socket assembly 12 with a relatively high fluid pressure in the conduit 16, the plug body 46 moves the slide valve 40 axially inwardly against the influence of the biasing spring 70. However, the socket valve stem 78 is held against axially inward movement by fluid pressure forces against the main valve 34. Therefore, the plug valve stem 114 is moved axially inward against the influence of the biasing spring 118. Once the plug assembly 14 has been inserted into the socket assembly 12, increasing the fluid pressure in the conduit 18 causes the fluid pressure on opposite sides of the main valve 34 to increase until it is opened under the combined influence of fluid pressure forces and the plug valve sping 118.

In view of the foregoing description it is apparent that the present invention provides a new and improved minimum spillage coupling 10 which is relatively easy to assemble and inexpensive to fabricate. The improved minimum spillage coupling includes a socket assembly 12 having a socket valve stem 78 with a head end seal 38 which is sealingly engaged by a slide valve 40 as the plug assembly 14 is disconnected from the socket assembly. A slide valve biasing spring 70 then presses the slide valve 40 against the valve stem 78 to pull the main valve 34 to a closed condition. The cooperation between the head end seal 38 on the socket valve stem 78 and the slide valve 40 is such as to minimize spillage as the coupling 10 is disconnected.

Having described a specific preferred embodiment of the invention, the following is claimed:

1. A coupling for conducting fluid between a pair of conduits, said coupling comprising a socket assembly adapted to be connected with one of the conduits and a plug assembly adapted to be connected with the other of the conduits, said socket assembly including a socket body defining a first valve chamber, a main valve seat disposed within said first valve chamber, a main valve element disposed within said first valve chamber, said main valve element being movable outwardly from an open position spaced apart from said main valve seat to a closed position disposed in sealing engagement with said main valve seat, said main valve element being effective in said closed position to block fluid flow through said socket body, a socket valve stem connected with and extending outwardly from said main valve element, a valve sleeve disposed within said first valve chamber outwardly of said main valve seat and circumscribing said socket valve stem, said valve sleeve being movable outwardly from an open position to a closed position in which said valve sleeve is disposed in sealing engagement with said socket valve stem, and first spring means disposed within said first valve chamber for moving said valve sleeve outwardly from its open position into abutting engagement with said socket valve stem and for pressing a surface on said valve sleeve against a surface on said socket valve stem to pull said main valve element outwardly from its open position to its closed position in sealing engagement with said main valve seat, said plug assembly including a plug body defining a second valve chamber and adapted to be telescopically received within said first valve chamber, first surface means connected with said plug body for moving said valve sleeve inwardly from its closed position to its open position upon movement of said plug body into said first valve chamber, a plug valve stem disposed within said second valve chamber and movable outwardly from an open position to a closed position blocking fluid flow through said plug body, and second surface means disposed on said plug valve stem for engaging said socket valve stem and moving said main valve element inwardly from its closed position to its open position upon movement of said plug body into said first valve chamber.

2. A coupling as set forth in claim 1 wherein said socket assembly further includes stop means for blocking inward movement of said main valve element under the influence of said plug valve stem when said main valve element moves to its open position upon movement of said plug body into said first valve chamber and for preventing inward movement of said socket valve stem when said main valve element is in its open position, and third surface means on said socket valve stem for applying pressure against said second surface means to move said plug valve stem inwardly from its closed position to its open position upon movement of said main valve element from its closed position to its open position.

3. A coupling as set forth in claim 1 further including annular seal means for sealing engaging said valve sleeve when it is in its closed position and for sealingly engaging said plug body when said valve sleeve is in its open position and said plug body is at least partially disposed within said first valve chamber.

4. A coupling as set forth in claim 1 wherein said socket body includes a generally cylindrical inner wall portion which at least partially defines said first valve chamber and is disposed inwardly of said main valve seat, said socket assembly further including guide means disposed in sliding engagement with said inner wall portion of said socket body and fixedly connected with said main valve element for guiding movement of said main valve element between its open and closed positions.

5. A coupling as set forth in claim 1 wherein said socket valve stem includes an elongated body portion connected with said main valve element and a head portion disposed on an outer end of said elongated body portion said head portion including third surface means for engaging said second surface means upon movement of said plug body into said second valve chamber and forth surface means for abuttingly engaging said valve sleeve upon movement of said valve sleeve from its open position to its closed position.

6. A coupling for conducting fluid between a pair of conduits, said coupling comprising a socket assembly adapted to be connected with one of the conduits and a plug assembly adapted to be connected with the other of the conduits, said socket assembly including a socket body defining a first valve chamber, a main valve seat disposed within said first valve chamber, a main valve element disposed within said first valve chamber, said main valve element being movable outwardly from an open position spaced apart from said main valve seat to a closed position disposed in sealing engagement with said main valve seat, said main valve element being effective in said closed position to block fluid flow through said socket body, a socket valve stem connected with and extending outwardly from said main valve element, said socket valve stem including a body portion extending outwardly from said main valve element and an enlarged head portion connected to said body portion, a valve sleeve disposed within said first valve chamber outwardly of said main valve seat and circumscribing said socket valve stem, said valve sleeve being movable outwardly from an open position to a closed position in which said valve sleeve is disposed in sealing engagement with said socket valve stem, annular seal means connected with said socket body for sealingly engaging said valve sleeve when it is in its closed position, and first spring means disposed within said first valve chamber for moving said valve sleeve outwardly from its open position into abutting engagement with said head portion of said socket valve stem and for pressing a surface on said valve sleeve against a surface on said head portion of said socket valve stem to pull said main valve element outwardly from its open position to its closed position in sealing engagement with said main valve seat, said plug assembly including a plug body defining a second valve chamber and adapted to be telescopically received within said first valve chamber, said plug body having an outer surface which is sealingly engaged by said annular seal means when said plug body is received within said first valve chamber, first surface means connected with said plug body for moving said valve sleeve inwardly from its closed position to its open position upon movement of said plug body into said first valve chamber, a plug valve stem disposed within said second valve chamber and movable outwardly from an open position to a closed position blocking fluid flow through said plug body, and second surface means disposed on said plug valve stem for engaging said socket valve stem and moving said main valve element inwardly from its closed position to its open position upon movement of said plug body into said first valve chamber, said socket assembly including stop means for blocking inward movement of said main valve element under the influence of said plug valve stem when said main valve element moves to its open position upon movement of said plug body into said first valve chamber and for preventing inward movement of said socket valve stem when said main valve element is in its open position, and third surface means on said socket valve stem for applying pressure against said second surface means to move said plug valve stem inwardly from its closed position to its open position upon movement of said main valve element from its closed position to its open position.

7. A coupling for conducting fluid between a pair of conduits, said coupling comprising a socket assembly adapted to be connected with one of the conduits and a plug assembly adapted to be connected with the other of the conduits, said socket assembly including a socket body defining a first valve chamber, a main valve seat disposed within said first valve chamber, a main valve element disposed within said first valve chamber, said main valve element being movable outwardly from an open position spaced apart from said main valve seat to a closed position disposed in sealing engagement with said main valve seat, said main valve element being effective in said closed position to block fluid flow through said socket body, a socket valve stem connected with and extending outwardly from said main valve element, said socket valve stem including a head portion having a radially projecting surface, a valve sleeve disposed within said first valve chamber outwardly of said main valve seat and circumscribing said socket valve stem, said valve sleeve being movable outwardly from an open position to a closed position in which said valve sleeve is disposed in sealing engagement with said socket valve stem, said valve sleeve including a circular surface which circumscribes said head portion of said valve stem when said valve sleeve is in the closed position and an inner surface which projects radially inwardly from said circular surface and abuttingly engages said surface on said head portion of said valve stem when said valve sleeve is in closed position, and first spring means disposed within said first valve chamber for moving said valve sleeve outwardly from its open position into engagement with said socket valve stem and for pressing said inner surface of said valve sleeve against said surface on said head portion of said socket valve stem to pull said main valve element outwardly from its open position to its closed position in sealing engagement with said main valve seat, said plug assembly including a plug body defining a second valve chamber and adapted to be telescopically received within said first valve chamber, first surface means connected with said plug body for moving said valve sleeve inwardly from its closed position to its open position upon movement of said plug body into said first valve chamber, a plug valve stem disposed within said second valve chamber and movable outwardly from an open position to a closed position blocking fluid flow through said plug body, and second surface means disposed on said plug valve stem for engaging said socket valve stem and moving said main valve element inwardly from its closed position to its open position upon movement of said plug body into said first valve chamber.

* * * * *